United States Patent Office 3,637,689
Patented Jan. 25, 1972

3,637,689
PROCESS FOR THE PREPARATION OF 4,6-DIAMINO-2-VINYL-s-TRIAZINE
Goro Inoue, Tokyo, and Hirokazu Fukumi, Iruma-gun, Japan, assignors to Asahi Kasei Kogyo Kabushiki Kaisha, Kita-ku, Osaka, Japan
No Drawing. Filed May 27, 1970, Ser. No. 41,049
Claims priority, application Japan, May 31, 1969, 44/42,092
Int. Cl. C07d 55/20
U.S. Cl. 260—249.9                                    8 Claims

ABSTRACT OF THE DISCLOSURE

An economically attractive process for the industrial production of 4,6-diamino-2-vinyl-s-triazine in high yield is provided. 1,2-bis(4',6'-diamino-s-triazinyl-(2'))-cyclobutane, available as a low cost-industrial commodity, is heated under reduced pressure to prevent thermal decomposition of the triazine rings and to crack the carbon-carbon bonds between the 1- and 2-positions and between the 3- and 4-positions of the cyclobutane ring. The resulting product is a useful monomer in the production of homo- or copolymers.

BACKGROUND

It is known that, 4,6-diamino-2-vinyl-s-triazine (identified as II in the equation that follows) can be prepared by the reaction of biguanide with acrylic acid chloride in an aqueous alkaline solution (3. Overberger et al. J. Am. Chem. Soc., 80, 988 (1958)), or obtained by the elimination of the dimethyl amino group in 4,6-diamino-2-(N,N-dimethyl amino ethyl)-s-triazine, previously prepared by the reaction of dimethyl amino-propionitrile with dicyandiamide (Dutch patent application No. 6802813).

In the above-mentioned prior art, complicated processing operations and also high cost reactants are required. Further, the yield of the desired product is insufficient. Therefore, the known methods are considered to be unsuitable for the production of 4,6-diamino-2-vinyl-s-triazine (II) in a commercially attractive manner.

It has now been discovered that 4,6-diamino-2-vinyl-s-triazine (II) can be readily prepared in high yield by the pyrolysis of 1,2-bis(4',6'-diamino-s-triazinyl-(2'))-cyclobutane (I) as shown in the following equation:

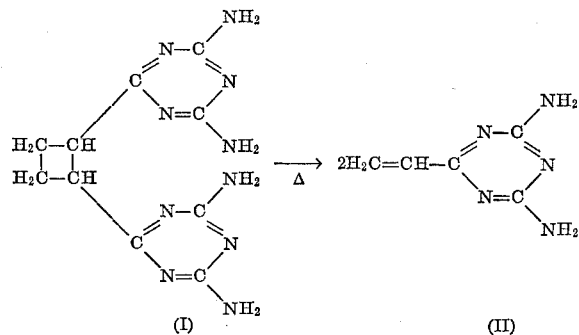

According to the literature when heterocyclic amino-aromatic compounds such as Compounds I and II are heated to a temperature higher than 350° C., there generally occurs the deamination followed by polycondensation or decomposition of said ring ("Heterocyclic Compounds." 7, P682,702, edited by Elderfield, John Wiley and Sons Inc.). Surprisingly under the conditions used in the present invention, Compounds I and II are completely protected from this undesirable reaction and are quite stable when heated to a high temperature.

SUMMARY

According to the present invention, 1,2-bis(4',6'-diamino-s-triazinyl (2'))-cyclobutane (I) is heated to a temperature of 250–1000° C. in a substantially oxygen-free atmosphere under reduced pressure to completely prevent the denaturation of the triazine ring of Compound I caused by thermal decomposition and for a period of time sufficient to permit the selective scission of carbon-carbon bonds between 1- and 2-positions and between 3- and 4- positions in the cyclobutane ring. Thus the desired product, 4,6-diamino-2 vinyl-s-triazine (II), is obtained in high yield.

DETAILED DESCRIPTION

Compound I is prepared in a high yield by the reaction of dicyandiamide with cyclobutane-1,2-dinitrile, which is obtained by the thermal dimerization of acrylonitrile, a low-cost industrial commodity.

The pyrolysis step of the invention is carried out at temperature in the range of from 250° C. to 1,000° C., preferably from 300° C. to 650° C. When the temperature is too low, a portion of the reactant sublimes and becomes mixed with the pyrolysis product. On the other hand, if the temperature is too high, undesirable by-products, produced by the decomposition of triazine ring, become mixed with the desired product.

The reaction is carried out in a substantially oxygen-free atmosphere under reduced pressure; the pressure in the reaction zone being preferably maintained in the range of from 0.01 mm. Hg to 100 mm. Hg. Thus, the reactant (I), which is sublimed by pre-heating, is introduced to a reaction tube at the above-mentioned temperature. The reactant is allowed to remain in the heating section of the reaction zone for a period of time sufficient to effect pyrolysis. The contact time, which is determined by the reaction temperature, the pressure in the reaction tube and the temperature of pre-heating, is generally controlled within a period of from 0.02 second to 1 minute, preferably 0.02 second to 20 seconds.

Any shaped reactor, conveniently a tube, may be used, provided that the above indicated reaction conditions can be maintained. The reaction tube can be made from any material provided that such material does not cause catalytic cracking of the reaction product. A quartz reaction tube has been found to be quite suitable.

Further, in the present invention, the yield of 4,6-diamino-2-vinyl-s-triazine can be increased by recycling 1,2-bis(4',6'-diamino-s-triazinyl-(2'))-cyclobutane which is recovered as unreacted starting material.

Optionally, a heat transfer medium may be placed in the reaction zone. Such heat transfer medium, or filling agent, serves to increase the contact time of the reactant in the heating section of the reaction zone or to increase the efficiency of pyrolysis by catalytic action. Suitable filling agents should not cause any catalytic loss of the reaction product through rupture of the triazine rings. Suitable filling agents include amorphous or crystalline silica; alkali metal salts or alkaline earth metal salts of silicic acid; alkali-treated alumina hydrate or aluminum oxide; silica alumina or silica alumina containing traces of other ions; macMehon or nickel or stainless steel; or mixtures of the foregoing materials.

4,6-diamino-2-vinyl-s-triazine thus prepared is effectively used as a monomer for making high polymers by homo- or co-polymerization; as an additive in synthetic resins; or as a physiologically active agent.

The present invention is further illustrated by the following examples.

EXAMPLE 1

2.0 g. of 1,2-(4',6'-diamino-s-triazinyl-(2')-cyclobutane was sublimed and subsequently introduced in a gaseous state into a quartz tube having a heating section maintained at a wall temperature of 600° C. and an interval pressure of 4 mm. Hg. The reactant was removed immediately and the reaction product separated in a cooling section of the reaction tube. After the reaction was completed, 1.5 g. of pyrolysis product was obtained as pale yellow powder from the reaction tube and the cooling trap, and 0.4 g. of non-sublimed material was recovered from the inlet portion of the tube.

The pyrolysis product was purified by recrystallization to give 1.2 g. of white crystals. The crystals, which decomposed at a temperature ranging from 300° C. to 305° C., were identified as 4,6-diamino-2-vinyl-s-triazine by NMR-spectra, IR-spectra and mass spectra.

EXAMPLE 2

3.0 g. of 1,2-bis(4',6'-diamino-s-triazinyl-(2'))cyclobutane was sublimed and, in the gaseous state, introduced into a quartz tube maintained at a wall temperature of 900° C. and an interval pressure less than 0.5 mm. Hg. The reactant was permitted to remain in the heating section of the reaction tube for a period of one second. After the reaction was completed, the reaction product was collected and recrystallized as described in Example 1 to give 2.3 g. of white crystals as the recrystallization product. The final product was identified as 4,6-diamino-2-vinyl-s-triazine as described in Example 1.

EXAMPLE 3

4.0 g. of 1,2-bis(4',6'-diamino-s-triazinyl-(2'))-cyclobutane was sublimed and then in gaseous state, introduced into a quartz tube maintained at a wall temperature of 450° C. and an interval pressure of 1 mm. Hg. When the reaction was completed and the product collected in the same manner as described in Example 1, 3.2 g. of the pyrolysis product and 0.8 g. of non-sublimed material were obtained. The pyrolysis product was purified by the recrystallization to give 3.0 g. of white crystals. The white crystals were identified as 4,6-diamino-2-vinyl-s-triazine by the same methods as described in Example 1.

EXAMPLE 4

4.0 g. of 1,2-bis(4',6'-diamino-s-triazinyl-(2'))-cyclobutane was sublimed and then, in gaseous state, introduced into a quartz tube which was filled with quartz sand having a particle diameter of from about 2 mm. to 6 mm. and maintained at an internal temperature of 320° C. and an interval pressure of 16 mm. Hg. After the reaction was completed, 3.0 g. of the pyrolysis product and 1.0 g. of the non-sublimed material were recovered as described in Example 1. The pyrolysis product was recrystallized to give 2.9 g. of white crystals. The white crystals were identified as 4,6-diamino-2-vinyl-s-triazine by the same methods as described in Example 1.

EXAMPLE 5

4.0 g. of 1,2-bis(4',6'-diamino-s-trizinyl-(2'))-cyclobutane was introduced into a reaction tube maintained at an interval pressure of 20 mm. Hg and then, heated to a wall temperature of 300° C. After one hour, the reaction product, which was separated in the cooling section of said reaction tube, was collected in an amount of 2.8 g. The product was purified by recrystallization to give 2.7 g. of white crystals, which were identified as 4,6-diamino-2-vinyl-s-triazine by the same methods as described in Example 1.

What is claimed is:

1. A process for the preparation of the 4,6-diamino-2-vinyl-s-triazine comprising heating 1,2-bis(4,6'-diamino-s-triazinyl-(2'))-cyclobutane in a substantially oxygen free atmosphere to a temperature of 250–1000° C. under reduced pressure for a period of time sufficed to effect cracking of the carbon-carbon bonds between the 1- and 2-positions and the 3- and 4-positions of the cyclobutane ring, and recovering 4,6-diamino-2-vinyl-s-triazine as a reaction product.

2. A process according to claim 1 in which the reduced pressure range between 0.01 mm. Hg and 100 mm. Hg.

3. A process according to claim 1 in which the period of time for cracking ranges between 0.02 second and 1 minute.

4. A process according to claim 1 wherein 1,2-bis(4',6'-diamino-s-triazinyl-(2'))cyclobutane is sublimed prior to being introduced into the reaction zone.

5. A process according to claim 1 wherein the unreacted starting material is recovered and recycled to the reaction zone.

6. A process according to claim 1 wherein the reaction zone is provided with a heat transfer material which does not cause undesirable side reactions.

7. A process according to claim 6 wherein more than one kind of filling agents consisting of amorphous or crystalline silica; alkali metal salts or alkaline earth metal salts of silicic acid; alkali-treated alumina hydrate or aluminum oxide; silica alumina or silica alumina containing traces of other ions; or macMehon of nickel or stainless steel, are filled in said reaction zone.

8. A process for the preparation of 4,6-diamino-2-vinyl-s-triazine comprising passing gaeous 2-bis(4',6'-diamino-triazinyl-(2'))-cyclobutane into a zone having a substantially oxygen free atmosphere under a reduced pressure between 0.01 mm. Hg and 100 mm. Hg at a temperature of 250–1000° C. for a period of time between 0.02 second and 1 minute and recovering 4,6-s-triazine from said zone.

References Cited
UNITED STATES PATENTS

| | | | |
|---|---|---|---|
| 2,689,238 | 9/1954 | Thomas | 260—249.9 X |
| 2,726,229 | 12/1955 | Padbury et al. | 260—249.9 X |
| 3,408,254 | 10/1968 | Greene et al. | 260—249.9 X |

JOHN M. FORD, Primary Examiner